(12) United States Patent
Lee et al.

(10) Patent No.: US 11,196,695 B2
(45) Date of Patent: Dec. 7, 2021

(54) DOCUMENT MANAGER INTEGRATION

(71) Applicant: Fish & Richardson P.C., Boston, MA (US)

(72) Inventors: G. Roger Lee, Belfast, ME (US); Son Nguyen, San Diego, CA (US); Beau F. Mersereau, San Diego, CA (US); John A. Dragseth, Excelsior, MN (US)

(73) Assignee: Fish & Richardson P.C., Minneapolis, MN (US)

( * ) Notice: Subject to any disclaimer, the term of this patent is extended or adjusted under 35 U.S.C. 154(b) by 2 days.

(21) Appl. No.: 16/892,127

(22) Filed: Jun. 3, 2020

(65) Prior Publication Data

US 2020/0296067 A1    Sep. 17, 2020

Related U.S. Application Data

(63) Continuation of application No. 15/257,604, filed on Sep. 6, 2016, now abandoned, which is a continuation
(Continued)

(51) Int. Cl.
*H04L 12/58* (2006.01)
*G06F 16/93* (2019.01)
(Continued)

(52) U.S. Cl.
CPC .............. *H04L 51/22* (2013.01); *G06F 16/93* (2019.01); *G06Q 10/00* (2013.01); *G06F 3/04842* (2013.01)

(58) Field of Classification Search
CPC ........... G06F 17/30011; G06F 3/04842; G06F 17/30126; G06F 21/6218; G06F 3/0481; G06F 3/04817; G06F 3/0482; G06F 17/22; G06F 17/2205; G06F 17/2229; G06F 17/2235; G06F 17/248; G06F 17/279; G06F 17/30091; G06F 17/30115; G06F 17/30235; G06F 17/30864; G06F 17/30876; G06F 17/30911; G06F 2203/04803; G06F 3/04845; G06F 3/0486; G06F 8/38; G06F 9/451; G06Q 10/00; G06Q 10/10; G06Q 10/107; G06Q 10/06; G06Q 30/02; G06Q 10/103; G06Q 20/102; G06Q 30/04; G06Q 40/08; G06Q 50/188; G06Q 99/00; H04L 51/22; H04L 51/14; H04L 51/18; H04L 51/34; H04L 51/38; H04L 12/5855; H04L 29/06; H04L 29/06027; H04L 41/0803;
(Continued)

(56) References Cited

U.S. PATENT DOCUMENTS 6,678,705 B1 *  1/2004  Berchtold ............... G06Q 10/10
7,043,489 B1 *  5/2006  Kelley ................... G06Q 10/10
(Continued)

*Primary Examiner* — Greg C Bengzon
(74) *Attorney, Agent, or Firm* — Fish & Richardson P.C.

(57) ABSTRACT

A computer-implemented document management method is discussed. The method includes displaying in a messaging application a plurality of folders for storing electronic mail messages, analyzing content one or more of the electronic mail messages to locate identifiers associated with matters in a document management system, and generating a user-selectable object that, when selected, automatically causes the generation of a document management display for a user of the messaging application.

13 Claims, 9 Drawing Sheets

Related U.S. Application Data of application No. 12/549,307, filed on Aug. 27, 2009, now abandoned.

(60) Provisional application No. 61/092,332, filed on Aug. 27, 2008.

(51) Int. Cl.
*G06Q 10/00* (2012.01)
*G06F 3/0484* (2013.01)

(58) Field of Classification Search
CPC ......... H04L 41/22; H04L 51/00; H04L 51/08; H04L 51/12; H04L 51/16; H04L 51/24; H04L 51/26; H04L 63/126; H04L 65/1069; H04L 67/14; H04L 69/329; H04L 9/321; H04L 9/3271
See application file for complete search history.

(56) References Cited

U.S. PATENT DOCUMENTS

| | | | | |
|---|---|---|---|---|
| 7,660,902 | B2* | 2/2010 | Graham | H04L 63/0281 709/229 |
| 7,962,385 | B2* | 6/2011 | Falk | G06Q 40/08 705/35 |
| 9,224,132 | B1* | 12/2015 | Knox | G06Q 50/18 |
| 9,811,576 | B2* | 11/2017 | McGregor | G06F 16/285 |
| 2002/0087534 | A1* | 7/2002 | Blackman | G06Q 10/10 |
| 2003/0126136 | A1* | 7/2003 | Omoigui | H04L 29/06 |
| 2003/0135558 | A1* | 7/2003 | Bellotti | G06Q 10/107 709/206 |
| 2003/0135559 | A1* | 7/2003 | Bellotti | G06Q 10/10 709/206 |
| 2003/0135659 | A1* | 7/2003 | Bellotti | G06Q 10/107 719/313 |
| 2004/0111302 | A1* | 6/2004 | Falk | G06Q 40/02 705/4 |
| 2004/0117361 | A1* | 6/2004 | Greer | G06F 16/2228 |
| 2005/0182773 | A1* | 8/2005 | Feinsmith | G06Q 10/10 |
| 2006/0026502 | A1* | 2/2006 | Dutta | H04L 12/1822 715/230 |
| 2006/0031340 | A1* | 2/2006 | Mathew | H04L 51/14 709/206 |
| 2006/0259524 | A1* | 11/2006 | Horton | G06Q 10/00 |
| 2007/0078771 | A1* | 4/2007 | Allin | G06Q 30/00 705/52 |
| 2007/0078886 | A1* | 4/2007 | Rivette | G06F 16/80 |
| 2007/0150299 | A1* | 6/2007 | Flory | G06Q 10/103 705/51 |
| 2007/0192155 | A1* | 8/2007 | Gauger | G06Q 10/103 705/301 |
| 2007/0250784 | A1* | 10/2007 | Riley | G06Q 10/10 715/764 |
| 2008/0114847 | A1* | 5/2008 | Ma | G06Q 50/184 709/206 |
| 2008/0263103 | A1* | 10/2008 | McGregor | G06F 16/447 |
| 2008/0288301 | A1* | 11/2008 | Emling | G06F 16/168 705/4 |
| 2010/0174974 | A1* | 7/2010 | Brisebois | G06Q 10/00 715/223 |
| 2018/0121530 | A1* | 5/2018 | McGregor | G06F 16/27 |

* cited by examiner

FIG. 4E

DOCUMENT MANAGER INTEGRATION

CROSS-REFERENCE TO RELATED APPLICATIONS

This application is a continuation of application Ser. No. 15/257,604 filed Sep. 6, 2016, which is a continuation of application Ser. No. 12/549,307 filed Aug. 27, 2009, which claims priority to U.S. Application Ser. No. 61/092,332, filed on Aug. 27, 2008, and entitled, "Document Manager Integration."

TECHNICAL FIELD

This document relates to techniques for providing access to documents stored by a computer system, such as to legal documents and docketing information using an electronic mail client.

BACKGROUND

Document management programs—software that tracks and organizes documents, such as by client or project, and that provides simplified user access to such documents by members of an organization—can be very helpful. At the same time, such software may be very complex to use and thus prevent workers from operating efficiently. Often, the more power such a program has, the more confusion it creates—when most users have a fairly well-defined and narrow set of tasks they need to complete.

Law firms and other similar professional organizations use document management programs to help dispersed teams keep track of documents, such as by automatically numbering documents and automatically storing the documents in assigned locations so that users may easily find and edit the documents at a later time. Such firms also use other software as part of their business function, such as docketing software to keep track of deadlines, and billing software to enter time spent on various projects for different clients. In addition, such firms may use more general-purpose software such as word processing software and electronic mail programs, such as MICROSOFT WORD and MICROSOFT OUTLOOK, respectively.

The general-purpose software is more broadly distributed in the business world than is the special-purpose software. As a result, it is more likely that new employees of a professional services firm will be familiar with such general-purpose software before they start at a new firm (either at a prior job or as part of their schooling), but they may not have experience with the specialized software. In addition, because such general-purpose software generates much more revenue than does special-purpose software such as document management systems, the user interfaces are likely to be more intuitive than those for the special-purpose software. Despite this point, the special-purpose software often makes little effort to be similar in appearance and functionality to the general-purpose software. Also, the special-purpose software often appears in windows that are separate from windows for the general-purpose software, so as to discourage users from employing the software in a seamless and efficient manner.

SUMMARY

This document describes systems and techniques that a user may employ in order to interact with documents in a document management system, using a an interface from a general-purpose program such as an e-mail client application. Specifically, in a particular embodiment, the right-hand panes in MICROSOFT OUTLOOK may be replaced with information reflecting a particular matter (i.e., discrete project for which documents are saved and organized together) on which a user of a system is staffed. The change in those panes may be triggered by the user selecting a folder from the ordinary folder area in the left-hand pane of the application, where the folder is directed to the matter rather than to an email folder. A user may also drag emails from the original right-hand panes into one such folder to have the email saved to the document management system where it can be accessed by a team on the project.

The right-hand panes may have two areas—one are that displays select subset of documents from the project, and one that shows other information, such as all the documents associated with a project. A user may drag icons for documents from the lower pane to the upper pane to make them part of the filtered list of documents. Also, a filtered list may be given a name, and multiple filtered lists may thus be kept (e.g., one for each user, one for each phase of a case, etc.). Documents may appear in multiple filtered lists because they may be filtered by using tags, and their location in a list may be only virtual. The lower pane may also display a variety of other information, and may be shown in a tabbed format so as to permit a user to see the different types of information in a full-scale presentation.

Certain other actions may be taken with respect to the particular matter that is currently displayed in the right-hand panes (and a matter may be "peeled off" so that the user can see their email inbox again or can see multiple matters simultaneously. For example, a user can be shown a list of matters that are linked to the current matter (e.g., matters that represent various different countries in which a patent application has been filed), and may click on an entry in the list to have a window open that shows a pane into that other matter. The user may then quickly make decisions relating to one of the matter that are affected by the other matter, such as determining how to respond to questions from a foreign patent associate after looking at documents in a corresponding U.S. case in which patent prosecution has already proceeded. Other various features may also be provided to a user of such a system, and are described in more detail below.

In one implementation, A computer-implemented document management method is disclosed. The method comprises displaying in a computerized messaging application a plurality of folders for storing electronic mail messages, analyzing content in one or more of the electronic mail messages to locate identifiers associated with matters in a document management system, and generating a user-selectable object that, when selected, automatically causes the generation of a document management display for a user of the messaging application. The user-selectable object can be displayed as one or more panes that replace one or more panes displaying emails or email content in the computerized messaging application. Also, the method can additionally include displaying, with email folders of the computerized messaging application, folders directed to matters in the document management system, and adding an email message to a matter in the document management system that corresponds to a folder in response to a user dragging an email to the folder. The method can further comprise displaying, in the document management display a control that when selected displays a list of matters related to a matter with which the control is associated. In addition, the method can include displaying, in response to a user selection of the control, a second document management display for a second matter from the list.

The details of one or more embodiments are set forth in the accompanying drawings and the description below. Other features and advantages will be apparent from the description and drawings, and from the claims.

DESCRIPTION OF DRAWINGS

FIG. 4E shows an example time entry tool that may be used with a system like system in FIG. 1.

Like reference symbols in the various drawings indicate like elements.

DETAILED DESCRIPTION

This document describes systems and techniques that may be employed to present an improved computer user interface to workers such as members of a professional organization that require access to a number of disparately managed pieces of data. In the example shown in this document, an electronic mail program, such as MICROSOFT OUTLOOK, which may be very familiar to a large number of users, is used as a host for a number of additional features not present in the basic implementation of the electronic mail application. For example, the electronic mail application may be used as a user interface for presenting data concerning documents stored in a document management system for an organization, and docketing information for a worker such as a patent attorney employed by the organization. The electronic mail application, with its extensions, may also receive input from the user, such as input to launch documents for editing and input to enter time that the user spends on particular projects. The information may be organized in a project-centric or matter-centric manner, and may use project or matter numbers to relate various pieces of information to each other.

Figure 1:
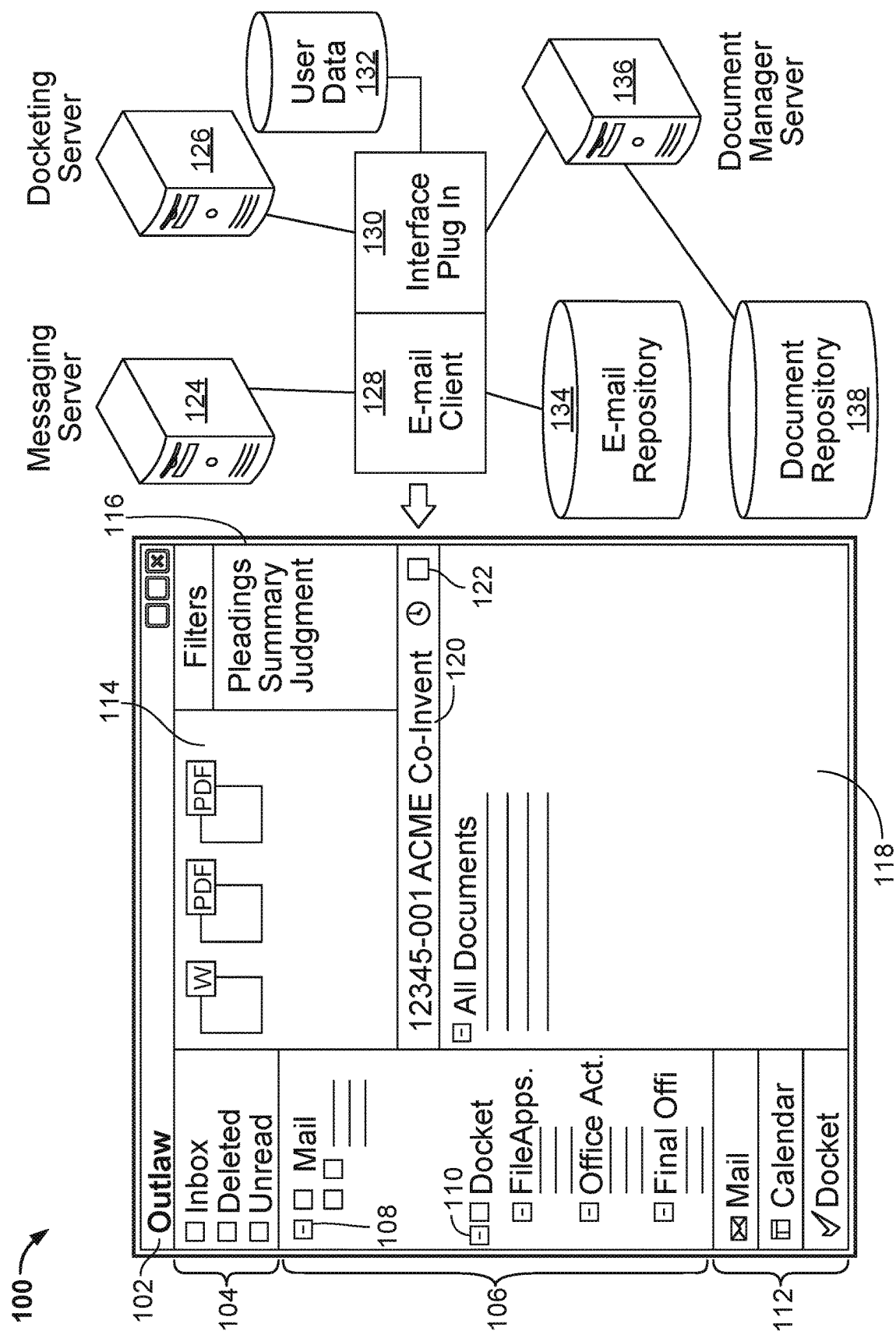
FIG. 1 shows a conceptual diagram of a messaging system integrated with a document management system.

FIG. 1 shows a conceptual diagram of a messaging system integrated with a document management system. In the figure, the overall system 100 is presented in the form of a display 102 that is a user interface similar to the MICROSOFT OUTLOOK user interface, but modified and augmented in various manners. In particular, like a MICROSOFT OUTLOOK interface, the interface 102 includes a navigation area at its left side, and more detailed areas at the right side (in top and bottom panes). During normal use, the interface 102 may look like a standard electronic mail interface, with mail folders at the left side, a list of recent mail messages in the upper right pane, and the text of a particular highlighted message in the lower right pane. In such a scenario, a matter bar 120 may be presented between the list of electronic mails and the reading pane and may present information about a matter, where the system 100 has been able to determine the context for such a matter. For example, a law firm may assign client and matter numbers for each of the clients the firm represents and each of the matters for each of those clients. As one example, a client number may be five digits, and a matter number four digits so that the first matter handled for a particular client may be identified as 31234-0001. In this example, the data shown is provided by the PROLAW application from THOMPSON WEST, and the display shown here is provided as a form of skin and filter over the front of PROLAW.

The system 100 may search for such client-matter numbers, such as by identifying alphanumeric strings that match a particular format (e.g., five digits followed by four digits) in the text or subject lines of e-mails in the system 100. Such identification of a client-matter number may permit the system 100 to perform a number of contextual operations related to the relevant matter. In the example shown here, one such operation has already been performed, where the user has switched from an e-mail viewing mode to a document management viewing mode. Such transition may have occurred in a number of ways. In one example, the system 100 may present to the user a number of folders such as folder 108. Certain of the folders may be presented as e-mail folders in a manner that will be familiar to users of MICROSOFT OUTLOOK. Those folders may be organized under a main mail folder. Separately, a matters folder may represent various matters associated with a user of the system 100. For example, the system 100 may track all of the attorneys who are assigned to a particular matter, and each of those attorneys may have a folder for that matter presented to them in their messaging application. Selection of such a folder by an attorney may cause their application to transition to a document manager presentation mode as shown in FIG. 1.

A user may also access the document manager presentation mode from the e-mail mode in other manners. For example, a user may click on an e-mail that includes a client-matter number in the subject line of the message or in the message itself. When the user does so, the system 100 may identify the presence of the client-matter number, and may place information about that client-matter number, such as the number and the name of the matter, in area 120. The user may then click or double-click on area 122 to be converted to a presentation mode that shows document manager information such as that shown in interface 102 of FIG. 1.

Referring now more specifically to the components of the interface 102, there are shown a number of components that vary little from a standard MICROSOFT OUTLOOK presentation, and that do not change much or at all when a user toggles between presentation modes. For example, a main navigation area 104 presents a number of selections so that the user may see various folders in their system, such as their inbox folder, a folder with deleted items, and a folder with unread items. Additional folders may include folders created by users and that relate to document repository information rather than messaging information.

A folders area 106 is organized in a manner similar to that for a standard messaging system. Such an area may be supplemented however, with folders relating to non-messaging functions. For example, as discussed above, a set of folders may be provided that relate to matters within the document management system, so that for example, a user may drag e-mail messages from area 114 into the folders to have those messages saved by the document management system, so that the user does not have to separately save them in their messaging folders.

When a user takes such an action, a separate message may be provided to each other recipient of the initial electronic mail message, informing them that the message has been saved to the document management system. Such a message may be presented as an icon in the subject line of the e-mail. As a result, each of the users may then delete the message with the understanding that it has already been saved in a central location. In this manner, the system 100 may provide substantial storage savings for an organization and may also allow users to better manage their e-mail inboxes.

As an additional example of a type of folder, a group of docket folders 110 is shown in the figure. The docket folders may present data relating to a particular user's docket. For example, litigators in a law firm may have a docket that lists dates on which particular motions or other filings are due. Alternatively, patent prosecutors may have dockets on which they are supposed to file patent applications, patent office action responses, declarations, and other similar documents. The dockets folder 110 is organized to include a main folder, having subfolders for each sort of docket reminder for the user. For example, one subfolder may list only office action responses that are due in the near future for the user, and another folder may list final office action responses that are due for that same user. When the user expands any of the docket folders, each matter for which they have a docketing reminder may be displayed, such as in reverse chronological order. In this manner, a user may easily see what deadlines are approaching for them in each of the various types of filings that are due.

As an additional feature, the dockets folders may be integrated with the document manager presentation mode, so that clicking or double-clicking on a particular docket item may bring up the relevant information for that matter in the document manager presentation mode on the right-hand side of the display 102. In particular, when a user switches modes from messaging mode to document manager presentation mode, the upper right pane of the display 102 may change from a list of e-mail messages to a list (or group of icons) of important documents for a particular matter in primary pane 114, and a complete list of documents for that matter in secondary pane 118. The primary pane 114 gets its name because it shows only those documents that are most important. For example, when a user is preparing to respond to a Patent Office office action, they may only want to see a draft response that they need to file, a rejection document from the patent examiner, and copies of each of the prior art references that have been asserted against their patent application. Such documents may thus be displayed as icons in the primary pane.

Secondary pane 118 receives its name in this example because it shows all documents for a particular matter, including documents that may be peripheral to the current work of a user, such as documents for postcards to be sent to the patent office, fax cover sheets, and other documents that generally would get in the way of most people using the document management system. Such documents may be shown in the secondary pane 118 so that users may have access to them, but so that they are generally out of the way for most common use by a user.

A filters area 116 may be provided to permit a user to change which documents from the secondary pane 118 are shown in the primary pane 114. For example, a patent prosecutor may wish to have certain documents displayed when they are working on a patent application, but different documents displayed when they are later working on an office action response. However, they may want to be able to go back and see the documents that were displayed when they were working on the patent application. Filters may permit such toggling between different modes of documents. A similar manner, a litigation team may establish a filter that shows all of the pleadings that have been filed in a case, all the summary judgment motions and related papers for a case, all of the hot documents for a case, or any other documents they would like to shown this manner. The filters may simply apply tags to documents shown in the secondary pane 118, and the application may select documents from the secondary pane based on matching a selected filter to the tags.

The documents that are to be shown in the primary pane 114 for any particular filter may be selected in a variety of manners. In one example, a user may define a filter, and may then will move their pointer to the secondary pane 118 and drag the relevant documents up to the primary pane 114. Identifiers for each document dragged to the primary pane may be registered at that time so that later regeneration's of display 102 will show the appropriate documents in the primary pane (e.g., by adding a tag to the document in a tracking database that matches the filter).

As noted above, placing a document in the primary pane will not necessarily move the document in the system, but may simply result in the tagging of the document related to the filter or filters for which that document is to be displayed in the primary pane 114. Documents may likewise be removed from the primary pane 114 by clicking on them and dragging them from the primary pane 114 down to the secondary pane 118.

As an alternative mechanism, documents may be placed in the primary pane automatically by a workflow system. For example, a law firm may receive office actions from the Patent Office electronically, which may trigger a workflow by which a staff member reviews the office actions to identify prior art cited by the patent office in the office actions. A pop up box may be shown to such a staff member in that workflow, and the staff member may be permitted to type one or more patent numbers relating to the office action, such as patents cited by the examiner in the office action. Such submission of patent numbers may result in a system automatically retrieving PDF copies of the patents and placing those PDF copies under a particular filter for the relevant matter. In that manner, as soon as a patent attorney with the firm receives a notice that an office action has been sent by the Patent Office, they could immediately click on an e-mail providing them with the notice, which may cause the system 100 to extract the client-matter number from the e-mail and open the document manager presentation mode, as shown here. The patent attorney may then open the draft office action response and work on it before sending it or otherwise filing it.

Another feature suggested by the figure, discussed in more detail with respect to FIG. 4E, below, is a time entry tool and time entry box 122. The time entry box 122 is a data entry area in which a user can enter a decimal number representing an amount of time spent on a matter. In one example, the user described above, who has received an e-mail indicating the presence of an office action, or who is moved into a document manager presentation mode by selecting a matter from their docket list, may work on a matter for a period of time, and when they are done working on it, may enter the amount of time they worked into box 122.

Again, the system 100 is displaying a particular matter number from the context in which the user launched the document manager presentation mode, and may automatically apply the amount of time entered by the user to that matter in billing records for the firm. Where a work description is required for the matter, the user may be prompted, such as with a pop-up box, to present the work description, or a suggested work description may be inferred from the context of the user's work, and the user may be given an opportunity to edit that work description. For example, where the primary pane 114 includes a document entitled "office action response" or "draft office action response," or were the filters establish that a project is in a particular phase, the work description main match that document name or phase. For example, the work description may indicate that the attorney who was working on a draft office action response.

Various components are shown schematically in the figure as an example by which the functionality described here may be delivered to a user. For example, an electronic mail client 128, such as MICROSOFT OUTLOOK, may be installed on a user's client computer and may provide basic e-mail and other messaging functionality. Such an application may also be provided with an application programming interface (API) to permit programmers to extend the functionality of the application. In this example, an interface plug-in 130 is shown, which serves as an interface between the display 102 and various applications other than the e-mail client 128. In addition, the interface plug-in affects what is displayed in display 102, such as in the manners just described. The electronic mail client 128 also references electronic-mail repository 134 in a familiar manner, and uses messaging server 124, which may take a form such as that provided by a MICROSOFT EXCHANGE SERVER system.

The interface plug-in 130 may access the data in a variety of forms and manners. For example, the interface plug-in 130 may make calls to a docketing server 126 so as to populate docket folders 110. As one example, the interface plug-in 130 may obtain an identifier (e.g., initials or employee number) for a particular user and submit that identifier to the docketing server 126 so as to receive in response a docketing report for that user that the plug-in may then reformat for display as folders 110. The user identifier may be obtained, for example, from the electronic mail client 128, or from a user data repository 132. Such a repository may be used to store a number of state variables needed to provide the functionality described for display 102. For example, the user data repository 132 may store information reflecting various document manager folders that should be displayed for the user, preferences for the user, a list of recent matters accessed by the user so that the user may bring up the list to return to matters conveniently that they've worked on the past, and other similar user-specific data. The user data 132 may be stored on a client device or on a central server, or may be stored in both locations and synchronized, as may other data described here in appropriate circumstances.

The interface plug-in 130 may also access a document management server 136 to obtain information about various clients and matters in an organization. For example, the interface plug-in 130 may scrape subject lines of e-mails to find an alphanumeric representation that matches an appropriate form, and may then submit that alphanumeric representation to the document management server 136 to determine whether the alphanumeric representation matches a client-matter number in the system 100. Also, the interface plug-in 130 may access the document management server to identify files associated with a particular matter to be displayed in primary pane 114 and secondary pane 118. When a user clicks on an icon or listing for any such document, the interface plug-in 130 may notify the document management server 136 to launch a word processing application or other similar application by which the user may edit the document. Such documents may be accessed from a document repository 138.

Figure 2:
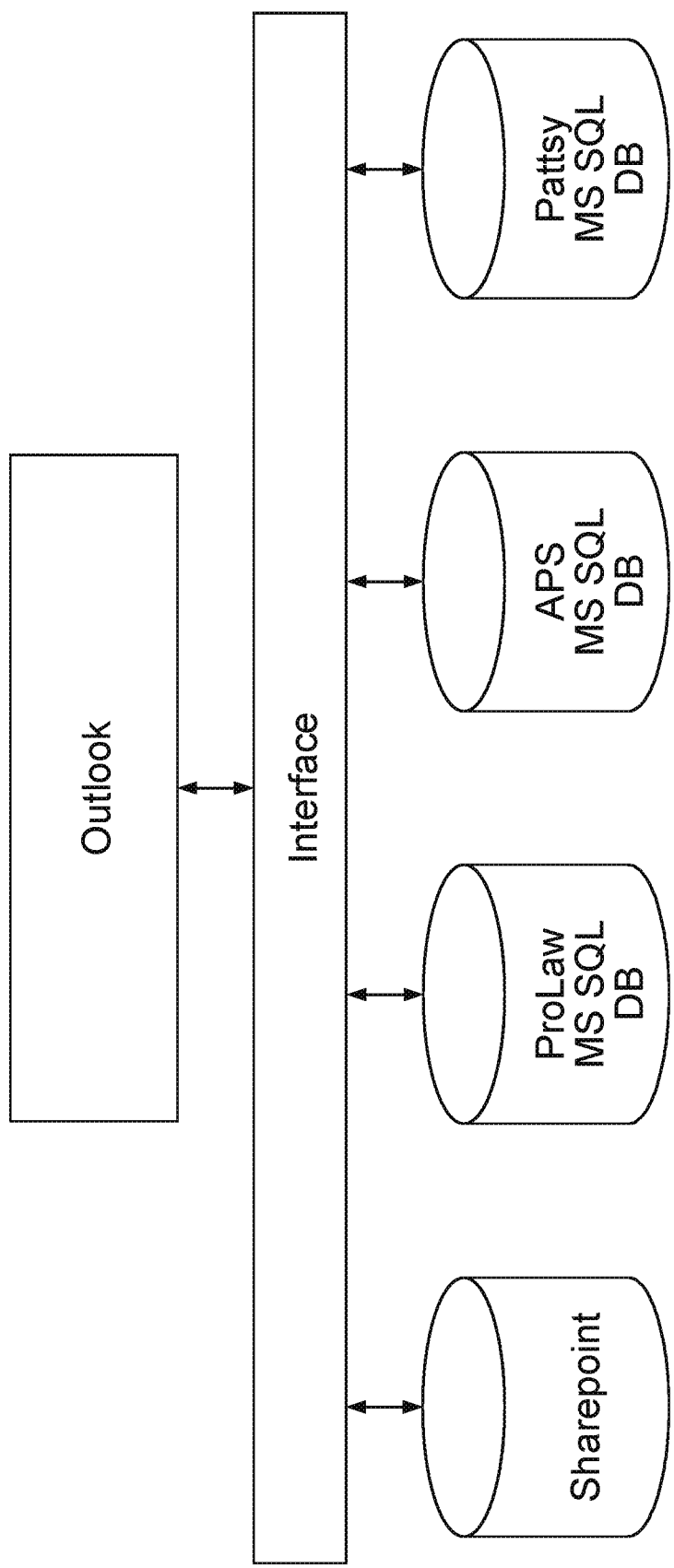
FIG. 2 generally represents a simplified schematic diagram for coordinating communications between various services a professional organization may use in conjunction with a messaging program.

FIG. 2 generally represents a simplified schematic diagram for coordinating communications between various services a professional organization may use in conjunction with a messaging program. In this example, a program such as interface plug-in 130 from FIG. 1 is shown as an interface. A number of additional services whose resources are employed to generate content to be displayed with the messaging application, are shown also interacting with the interface. For example, a SHAREPOINT database may be interacted with to obtain information to be displayed. Such a database may include information about clients, information necessary to identify which filters have been assigned to particular matters (e.g., tags), and other similar information. The database may particular store data that is not already stored by a pre-existing component in the system, such as the databases described next.

In a similar manner, a database for a particular practice group may be accessed, and in this figure that database is referred to as APS, an automatic patent system. In this example, APS is a backend service for managing the flow of documents in a patent prosecution practice. Such a system may receive electronically formatted documents from attorneys and their assistants within a firm, such as patent applications that have been uploaded and filed with the Patent Office. The system may also include documents downloaded from the Patent Office, such as file wrappers and office actions issue to the firm. The APS system may be accessed by the interface by identifying information such as to access documents that may not be available from a separate document management system.

Another data repository or system provides access to general documents managed in the system, and is marked as PROLAW in this example. PROLAW is a commercial document management system that is used by a number of law firms and is made available by the THOMPSON-WEST organization in Eagan, Minn. Such a system may provide information to the interface concerning names of clients and names of matters for those clients, lists of documents stored with respect to each matter, and mechanisms by which those documents may be launched or otherwise accessed. In addition, metadata associated with various clients and matters may be accessed, such as addressing data for electronic mails and the like.

Separately, a docketing system, which here is termed PATTSY, may be accessed to determine information for showing a user's docket. Such information may include client and matter numbers and due dates for particular events in those client and matter numbers. The system may also be supplied with information and may compute deadlines or other information as a service for the interface or the e-mail messaging application.

In each example, the various components may communicate with each other according to standard published application programming interfaces (APIs), and the interface may reformat, parse, or otherwise manipulate data that is received from each of the various subsystems in order to put the data in a form that may be useful by the messaging system. In a like manner, the interface may assemble, combine, or otherwise manipulate data coming from the messaging interface to be provided to the various other subsystems shown at the bottom of take two.

Figure 3A:
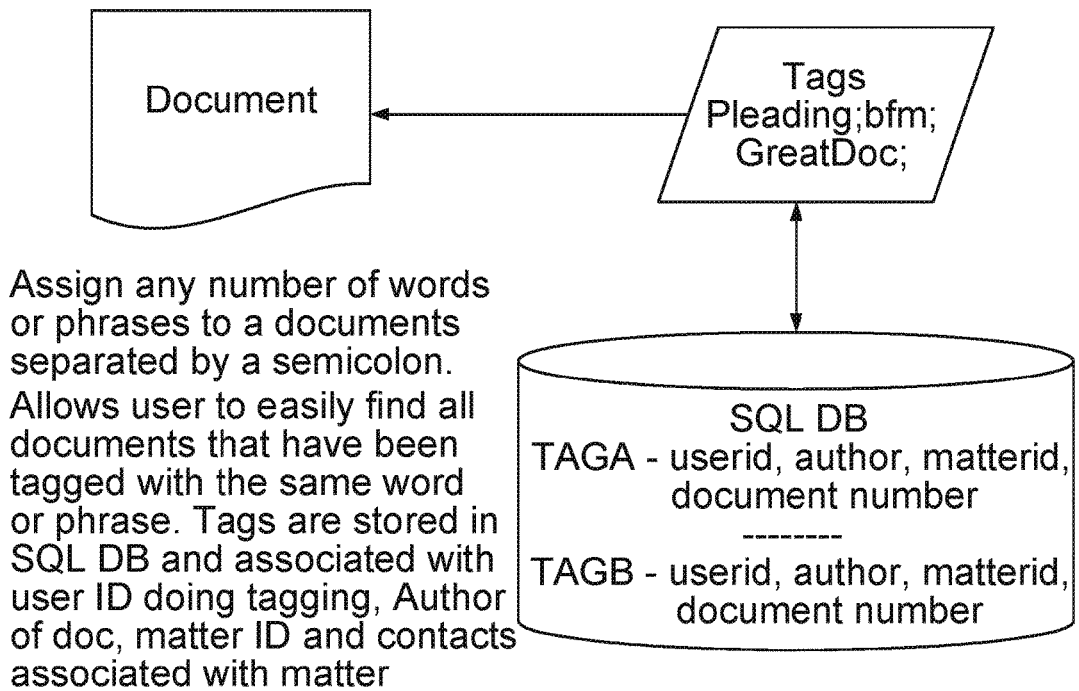
FIG. 3A shows an example for assigning tags to particular documents.

FIG. 3A shows an example for assigning tags to particular documents. Such tags may, for example, be associated with filters like those shown in FIG. 1. The tags may identify information or metadata associated with documents or other objects used by a system that works with a messaging system, so as to enrich the display of such data. The tags may then be associated with data elements that are stored in other some portions of the system, such as in a document manager server or other locations. In this manner, the existing elements of a messaging system, docketing system, and document management system may be enhanced by storing additional data in a separate location, and without having to alter the data in the existing systems. In appropriate situations, the data may be written back to the existing systems also.

Figure 3B:
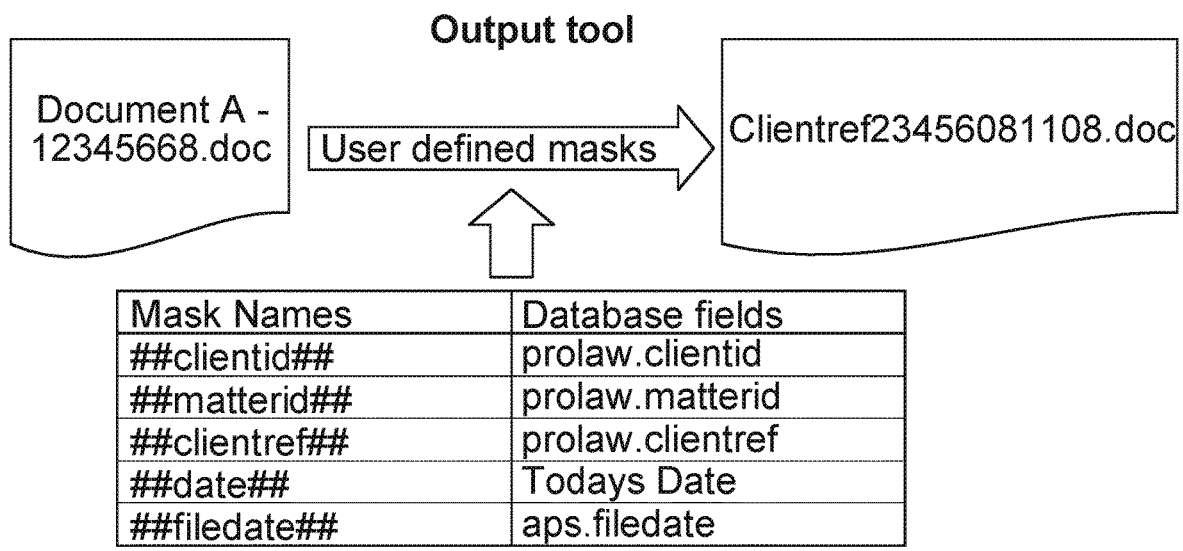
FIG. 3B shows one of several tools that may be used with a system such as system in FIG. 1.

FIG. 3B shows one of several tools that may be used with a system such as system 100 in FIG. 1. In this example, the tool is an output tool. In particular, in traditional document management systems, it may be difficult for a user to package together various documents, such as e-mails, to be sent to clients, so that the client may review the documents. In one example, a user may have to save each relevant document with a special name in a temporary folder, open a blank electronic mail message, and then attach each of the relevant documents to that message. Such actions may be particularly necessary where the client has specific standards that they want to enforce for attachments to e-mails and subject matter lines of such e-mails. Clients may prefer such formatting, where they use automated tools to filter incoming mail from their outside counsel.

In this example, a PROLAW document having an eight digit name—Document A—is run through a user-defined mask that renames the document. For example, a particular client may indicate that they would like their client reference number applied as a prefix to all documents that are sent to them so they can easily save and index such documents. The mask may then be defined by a user by identifying a field name for the document management system, such as a field name for a client reference number, and the output tool may then rename the document before it is added to electronic mail message by appending the particular client reference number to the name of the particular document. For example, the client name for a matter might be ACME123, and that string may be appending automatically to each file that is sent by users who are working under client-matter numbers for that client.

Figure 4A:
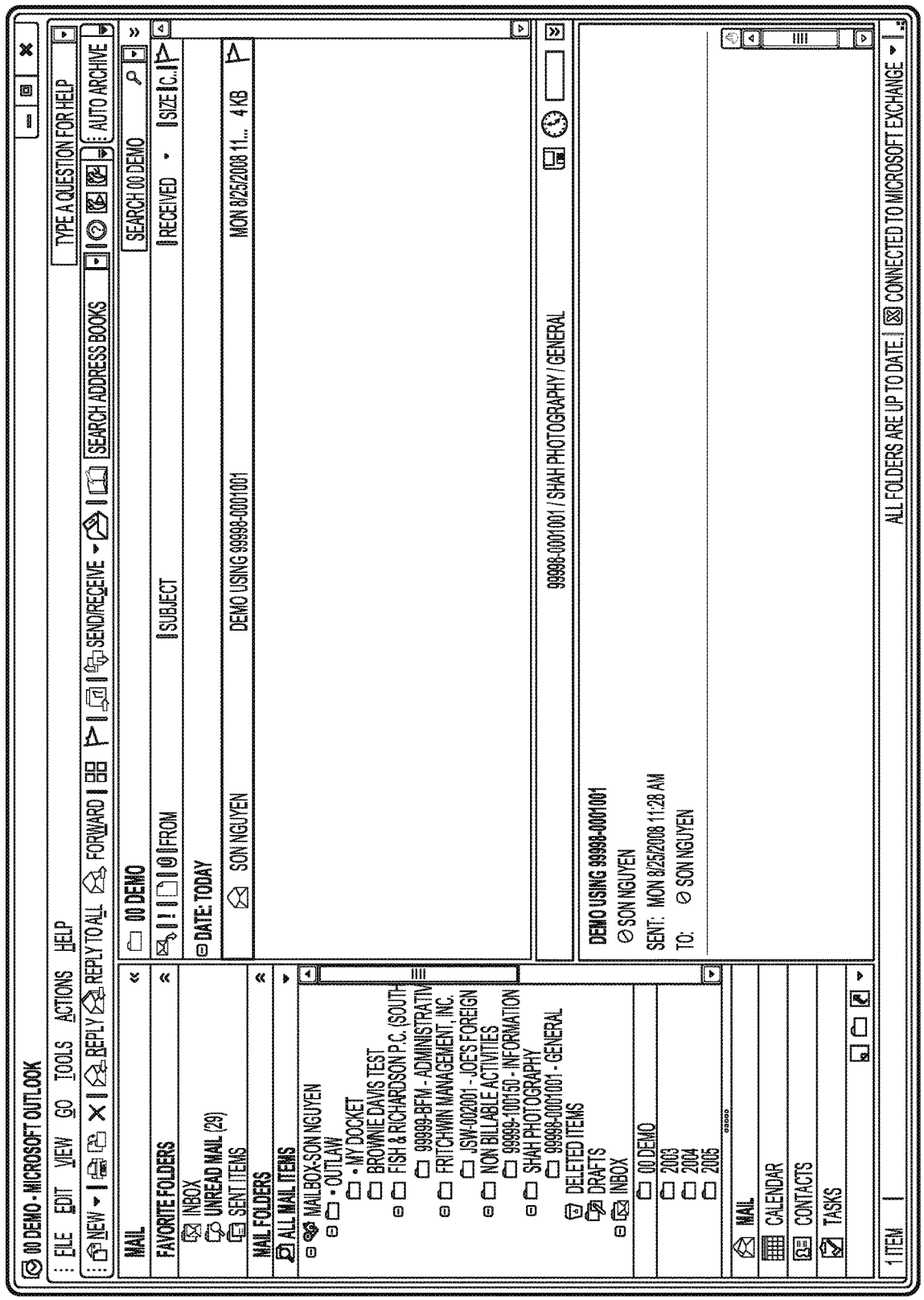
FIG. 4A shows a display similar to display in FIG. 1.

FIG. 4A shows a display similar to display 102 in FIG. 1. In this example, however, the display is in a messaging presentation mode. The user in this example has a single message in the "00demo" box, and that message includes a client matter number of 99998-0001001. The display has scraped that client-matter number from the subject line and has accessed a database associated with the document management system to add a client name and a matter name in the toolbar that lies between the upper and lower right-hand panes in the display here. The user may then click on a disk icon in that bar to save the particular mail message to the document management system for that matter, or may enter time into a white time box at the right end of the bar to bill time to the Shop Photography General matter showing here.

In addition, a number of subfolders are shown under an "outlaw" folder to the left of the figure, were each of those folders represents a client for this particular user. One of the folders is the folder associated with the matter for the highlighted message. As a result, the user in this example could also save the message to their document management system by dragging the message in to that particular folder, much as they would drag a message into a standard folder for a messaging system. The difference in this situation is that the message will be saved to the central document management system rather than to the individual user's messaging folder.

Figure 4B:
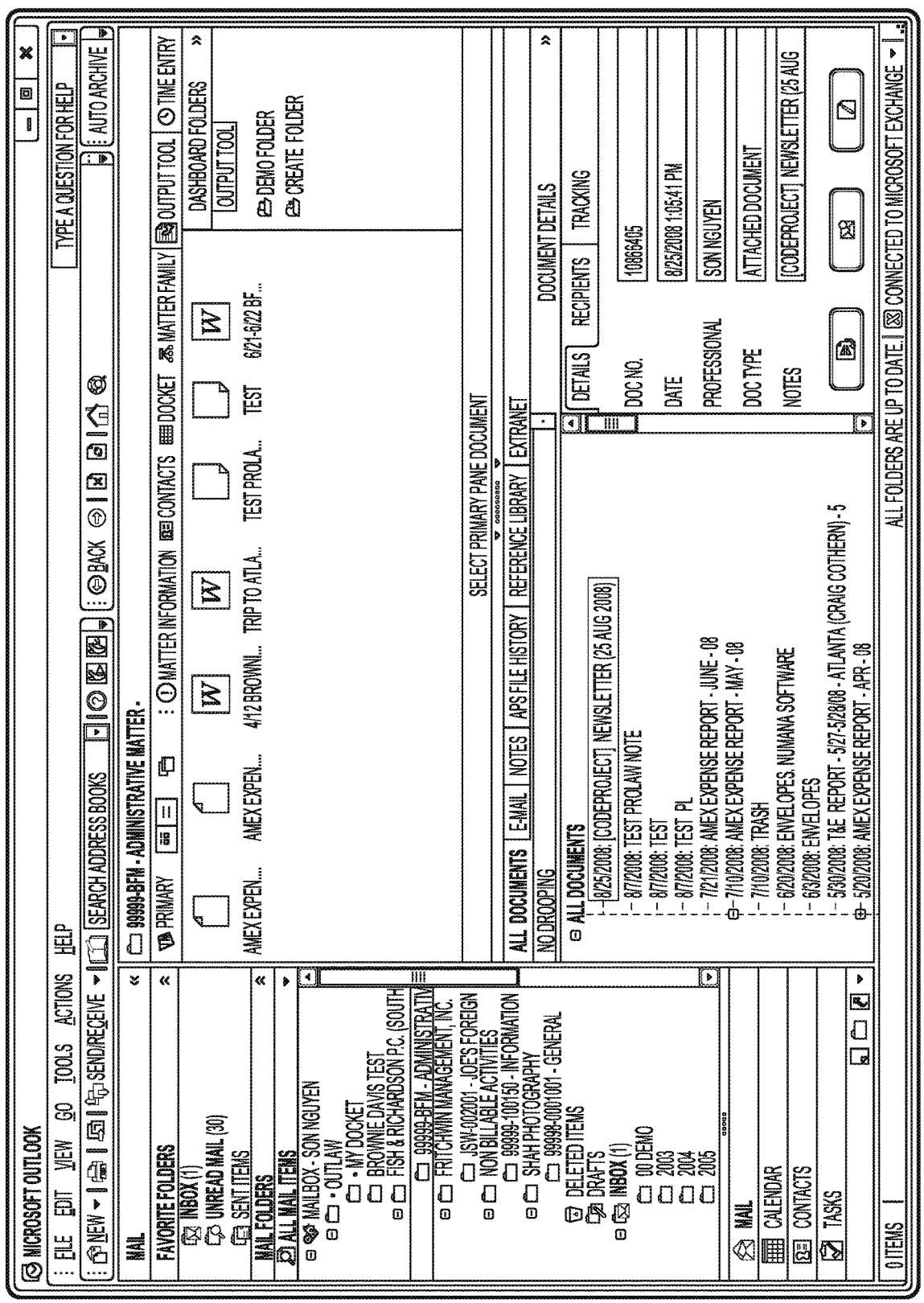
FIG. 4B shows a similar display to FIG. 4A, but in document manager presentation mode.

FIG. 4B shows a similar display to FIG. 4A, but in document manager presentation mode. Such a display is similar to display 102 in FIG. 1. In this example, the matter is titled "administrative matter," and includes a number of various document shown in the middle lower portion of the display. One such document, a newsletter, is highlighted, and metadata associated with that document is shown in the lower right part of the display. Additional tabs for the lower portion of the display, which was earlier termed the "secondary pane," are also provided for a user to interact with that matter. For example, an e-mail tab may be selected to show a list only of e-mails that have been stored with respect to that matter, but not to show word processing files or other similar files. Also, a Notes tab is shown, which may simply open an ASCII text file where user may enter notes. Such a Notes area may be used by members of a team to provide instructions to each other. For example, the notes area may be used by a prosecuting patent attorney to identify prior art that they have identified while working on a case, and a paralegal may later be trained to access that folder to determine whether there is any particular prior art that needs to be disclosed to the Patent Office. In this manner, the system provides an analog to older systems by which an attorney may have placed a physical copy of a prior art reference in a physical file.

The upper pane in this example is also referred as a dashboard, and includes three word processing files, two e-mail messages, and two additional files. The particular files are shown as icons here, but they may also be displayed is a list of items. A number of other selections are shown near the primary pane to permit time entry, to invoke the output tool discussed above, to add additional filters or folders in this example, to see a docket of events for the particular matter, to see a list of all matters in the system that someone has designated as being related to the present matter (so as to make it easier to cross-reference information between the cases), and to identify contacts for the particular matter such as the names of inventors for a patent prosecution matter and their electronic mail addresses.

Figure 4C:
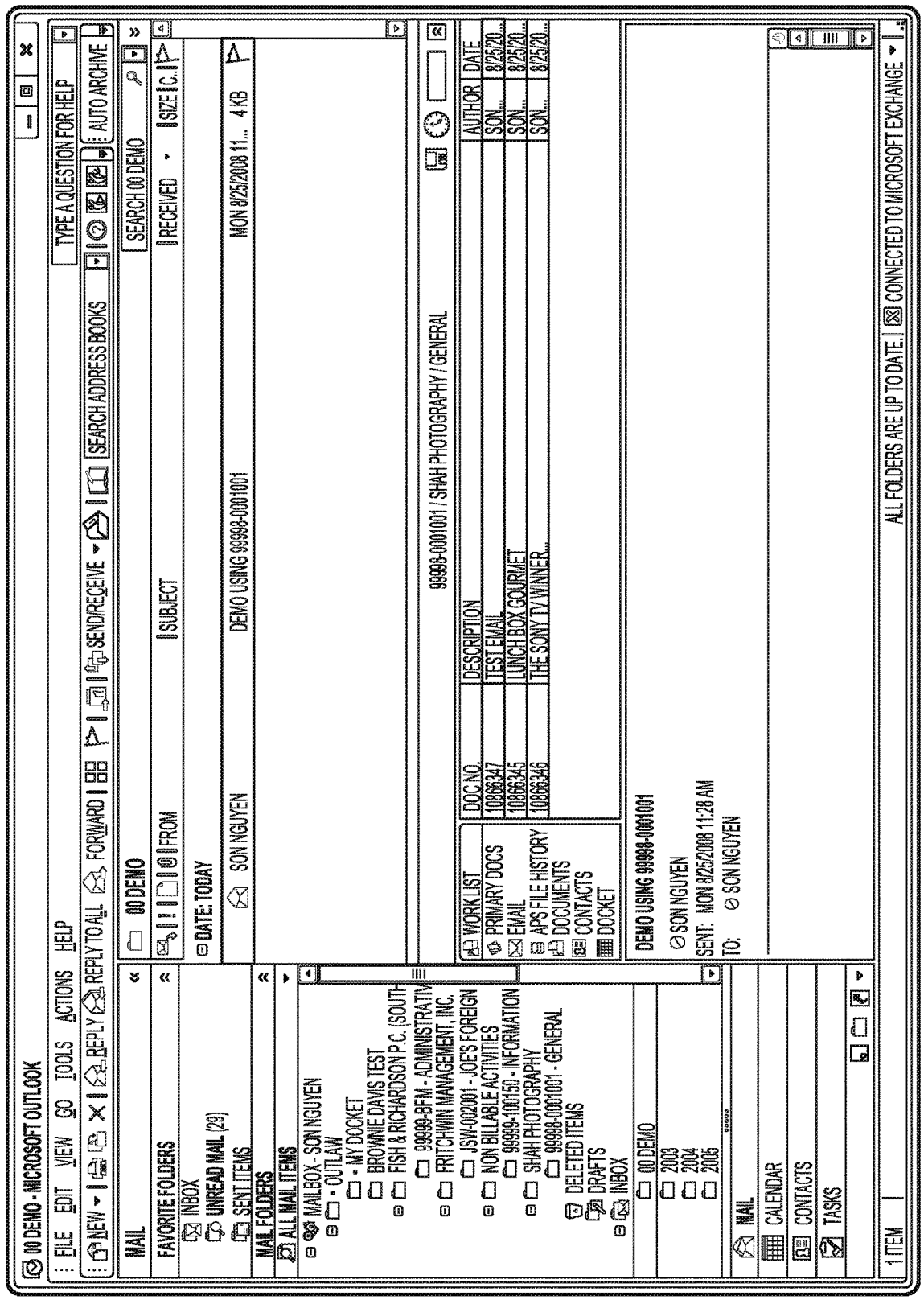
FIG. 4C is similar to FIG. 4A but shows a slightly expanded version of the bar in the middle of the page.

FIG. 4C is similar to FIG. 4A but shows a slightly expanded version of the bar in the middle of the page. In this expanded version, the user may access a number of limited pieces of functionality that would be accessible in the document manager presentation mode, but without having to switch entirely to that mode.

Figure 4D:
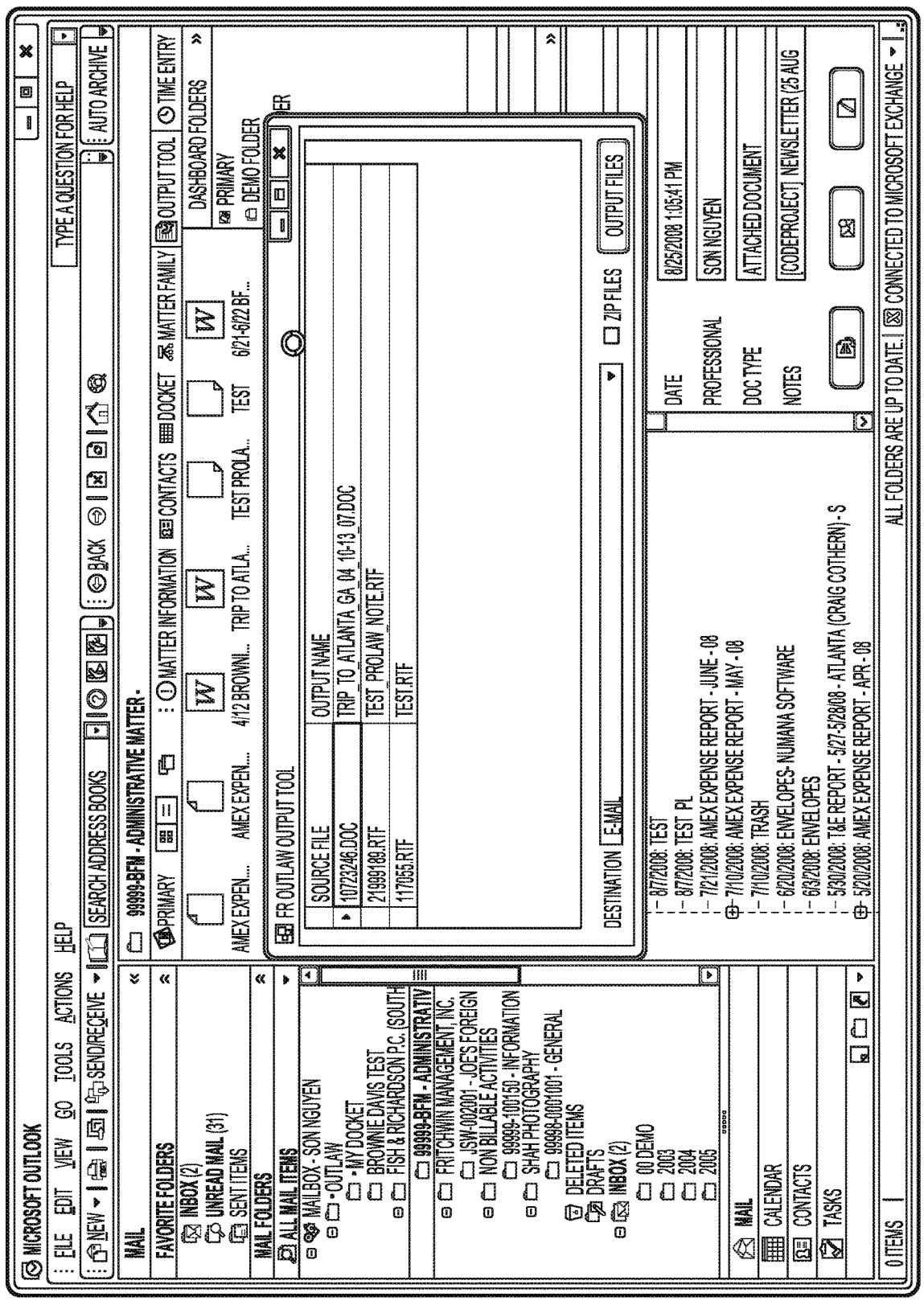
FIG. 4D shows an example operation of an output tool.

FIG. 4D shows an example operation of an output tool. In particular, a new document manager system such as PRLAW may provide nine-digit numbers for each document that are not very friendly for human use. Such a system may also include metadata with those document numbers that are more descriptive of the saved files. As a result, the output tool may map the metadata to each file so that those files are renamed before they are placed in and outgoing e-mail. In addition, though not shown, a user may be provided with a checkbox next each file to indicate whether they would like to change the file to a PDF format, such as where inventors at a particular client do not have access to a particular word processor. Also, a checkbox is provided at the bottom of the tool so that a user may indicate that they would like to have all of the attachments zipped into a single ZIP file, e.g. to provide security or to shrink the size of an outgoing message.

Figure 4E:
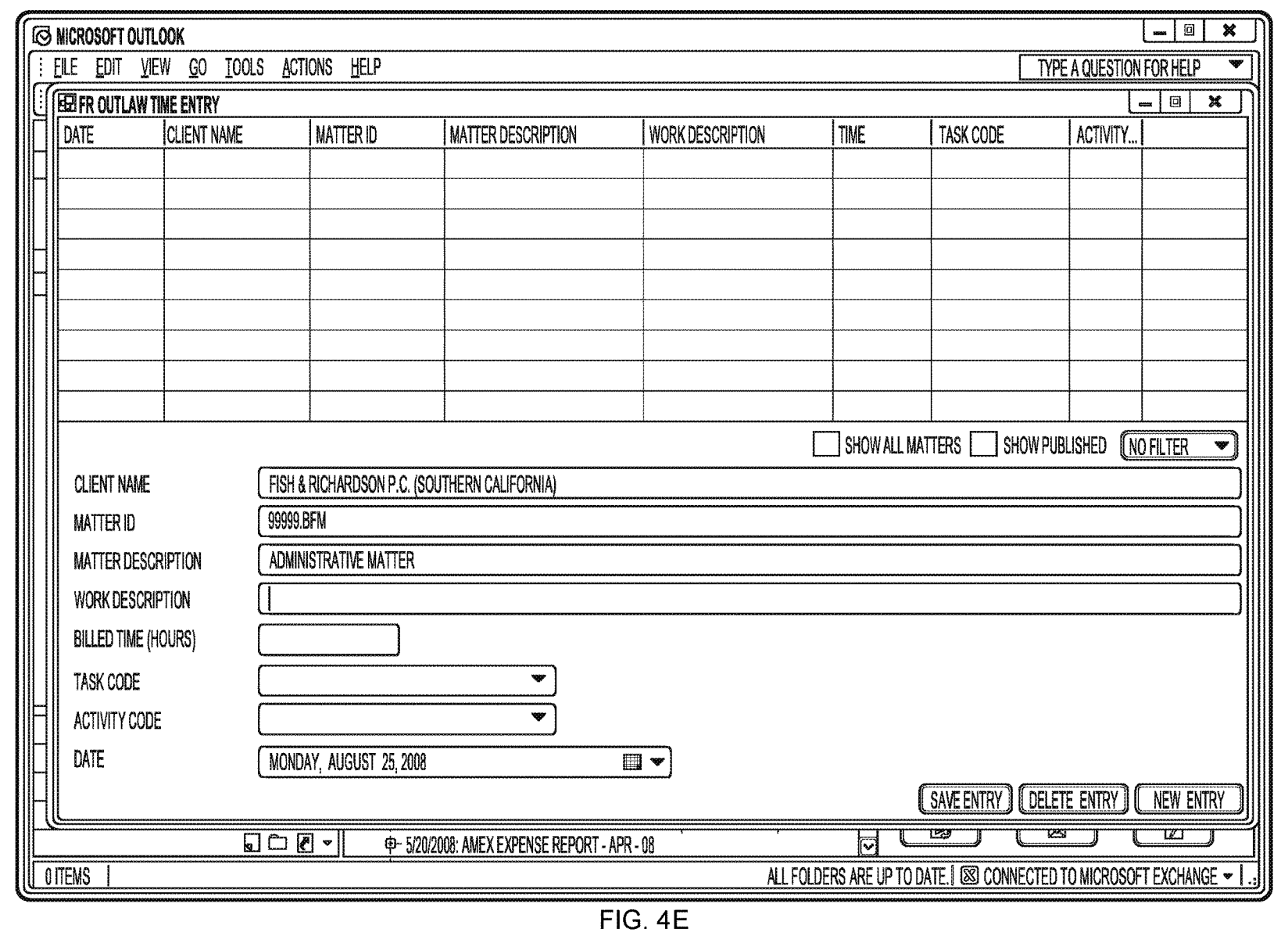

FIG. 4E shows an example time entry tool that may be used with a system like system 100 in FIG. 1. In particular, where a law firm uses a time entry application that is not fully compatible with the interface shown here, the interface may collect time entry from a user throughout a day and may then batch dump the entry data to the actual time entry application. Thus, for example, a user may enter data in a tabular format in a convenient manner as shown here, and may then dump that data to the time entry tool all at once. When the batch transfer is occurring, the user may be asked to correct data that is incorrect and could not be verified by the tool. Alternatively, the time entry tool shown here may provide data for verification as the user enters the data, such as by confirming that the user has entered appropriate client matter names that are open in a system, and has entered task codes and activity codes that are compatible with a client's particular wishes.

Figure 5:
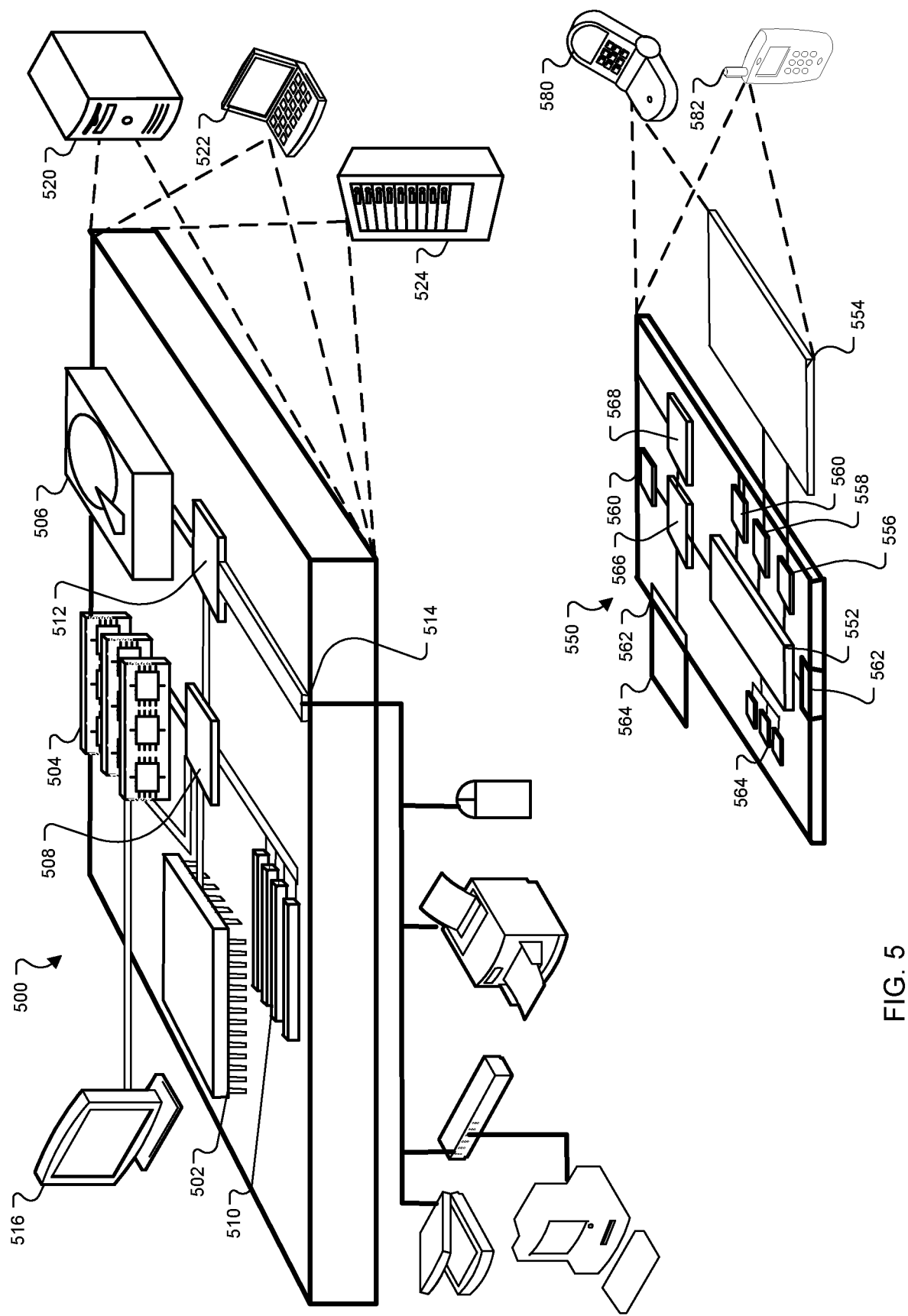
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to integrating particular legal applications with MICROSOFT OUTLOOK, but other forms of applications may be employed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented document management method, comprising:
    identifying, for an electronic mail message in a computer user's electronic mail in box, text in a subject line of the electronic mail message that identifies a project for which a document management system stores documents, the identifying occurring in response to the computer user selecting the electronic mail message in an e-mail application;
    obtaining, from the document management system and in response to identifying the project by matching the text in the subject line to a project ID for the project stored with the document management system, meta data that describes the identified project;
    displaying concurrently, to the user and with the electronic mail system, in response to obtaining the meta data:
        in a first displayed pane of the e-mail application, the subject line of the electronic mail message along with subject lines of other electronic mail messages in the user's electronic mail in box,
        in a second displayed pane of the e-mail application, the meta data from the document management system that describes the identified project and that was obtained in response to identifying the project from the text in the subject line, and
        a user-selectable item whose selection by the user launches an extension of the document management system to show additional meta data about the project;
    receiving a user selection of the user-selectable item;
        in response to receiving the user selection, changing a display of the electronic mail system to show, in a third displayed pane of the e-mail application that is distinct from the first and second panes, content from the extension of the document management system, wherein the shown content comprises the additional meta data about the project that was not included in the electronic mail message, a list of documents that the document management system associates with the project, or both; and
        receiving a user selection of a docket control displayed to the user, and in response to receiving the user selection, displaying a docket for the identified project that includes deadlines for the project.

2. The computer-implemented method of claim 1, wherein the changing of the display comprises displaying one or more panes that display data from the document management system and replace one or more panes that previously displayed data from the electronic mail system.

3. The computer-implemented method of claim 1, further comprising displaying, in line with first folders that contain emails of the electronic mail application, second folders that contain documents stored by the document management system, wherein the user is enabled to drag electronic mails into one of the second folders to have the electronic mails copied from the electronic mail system to the document management system.

4. The computer-implemented method of claim 1, further comprising displaying a control that, when selected, causes display of a list of projects for the organization that correspond to the identified project.

5. The computer-implemented method of claim 1, further comprising identifying a user selection of a first of a list of electronic mail messages in the in box, analyzing content of a first of the electronic mail messages to identify a project associated with the first of the electronic mail messages, and displaying a description of the organizational matter as a result of the analyzing.

6. A computer-implemented document management method, comprising
    identifying, for an electronic mail message in a user's electronic mail in box and in response to the computer user selecting the electronic mail message, text in a subject line of the electronic mail message that identifies a project for an organization to which the user belongs;
    obtaining, from a document management system and in response to identifying the project from the text in the subject line, meta data that describes the identified project;
    presenting, to the user and with the electronic mail system in response to obtaining the meta data, the meta data from the document system that describes the identified project, and a user-selectable item whose selection by the user launches an extension of the document management system;
    receiving a user selection of the user-selectable item;
    in response to receiving the user selection, changing a display of the electronic mail system to show, in place of content previously shown by the electronic mail system, content from the extension of the document management system, wherein the shown content comprises additional meta data about the project that was not included in the electronic mail message, a list of documents that the document management system associates with the project, or both; and
    receiving a user selection of a docket control displayed to the user, and in response to receiving the user selection, displaying a docket for the identified project with deadlines for the project.

7. The computer-implemented method of claim 1, further comprising:
    receiving a user selection of a plurality of documents stored by the document management system and
    automatically generating an outgoing draft electronic mail message that includes the selection plurality of documents as attachments to the draft electronic mail message for the electronic mail system.

8. One or more tangible, non-transitory recordable media having recorded thereon instructions that, when executed, perform operations comprising:
    identifying, for an electronic mail message in a computer user's electronic mail in box, text in a subject line of the electronic mail message that identifies a project for which a document management system stores documents, the identifying occurring in response to the computer user selecting the electronic mail message in an e-mail application;
    obtaining, from the document management system and in response to identifying the project by matching the text in the subject line to a project ID stored with the document management system for the project, meta data that describes the identified project;

displaying concurrently to the user and with the electronic mail system, in response to obtaining the meta data:

in a first displayed pane of the e-mail application, the subject line of the electronic mail message along with subject lines of other electronic mail messages in the user's electronic mail in box, in a second displayed pane of the e-mail application, the meta data from the document management system that describes the identified project and that was obtained in response to identifying the project from the text in the subject line, and a user-selectable item whose selection by the user launches an extension of the document management system to show additional meta data about the project;

receiving a user selection of the user-selectable item;

in response to receiving the user selection, changing a display of the electronic mail system to show, in a third displayed pane of the e-mail application that is distinct from the first and second panes, content from the extension of the document management system, wherein the shown content comprises the additional meta data about the project that was not included in the electronic mail message, a list of documents that the document management system associates with the project, or both and receiving a user selection of a docket control displayed to the user, and in response to receiving the user selection, displaying a docket for the identified project that includes deadlines for the project.

9. The media of claim 8, wherein the operations further comprise:

displaying, in line with first folders that contain emails of the electronic mail application, second folders that contain documents stored by the document management system, wherein the user is enabled to drag electronic mails into one of the second folders to have the electronic mails copied from the electronic mail system to the document management system.

10. The media of claim 8, wherein the operations further comprise displaying a control that, when selected, causes display of a listed of projects for the organization that correspond to the identified project.

11. The media of claim 10, wherein the operations further comprise displaying, in response to a user selection of the user-selectable control, changing the display of the electronic mail system to show, in place of content previously displayed by the electronic mail system, content from the extension of the document management system, wherein the displayed content comprises details about the project that were not included in the electronic mail message, a list of documents that the document management system associates with the project, or both.

12. The media of claim 8, wherein the operations further comprise identifying a user selection of a first of a list of electronic mail messages in the in box, analyzing content of a first of the electronic mail messages to identify a project associated with the first of the electronic mail messages, and displaying a description of the organizational matter as a result of the analyzing.

13. The media of claim 8, wherein the operations further comprise:

receiving a user selection of a plurality of documents stored by the document management system and automatically generating an outgoing draft electronic mail message that includes the selection plurality of documents as attachments to the draft electronic mail message for the electronic mail system.

\* \* \* \* \*